United States Patent
Kemmler et al.

(10) Patent No.: US 9,401,654 B2
(45) Date of Patent: Jul. 26, 2016

(54) DEVICE FOR MODIFYING AN AC VOLTAGE, AC VOLTAGE HAVING A SUPERIMPOSED DATA SIGNAL, METHOD FOR DATA TRANSMISSION, USE OF A RECEIVER AND COMMUNICATION ARCHITECTURE

(75) Inventors: Wolfgang Kemmler, Schlieren (CH); Matthias Tramm, Wildberg (CH); Eckhard Bröckmann, Buseck (DE); Daniel Trollhagen, Wetzlar (DE); Wilfried Beck, Wiesbaden (DE)

(73) Assignee: Aizo Group AG, Schlieren (CH)

(*) Notice: Subject to any disclaimer, the term of this patent is extended or adjusted under 35 U.S.C. 154(b) by 694 days.

(21) Appl. No.: 13/497,972

(22) PCT Filed: Sep. 30, 2010

(86) PCT No.: PCT/EP2010/005965
§ 371 (c)(1),
(2), (4) Date: Mar. 23, 2012

(87) PCT Pub. No.: WO2011/038912
PCT Pub. Date: Apr. 7, 2011

(65) Prior Publication Data
US 2012/0224645 A1    Sep. 6, 2012

(30) Foreign Application Priority Data

| Sep. 30, 2009 | (DE) | 20 2009 013 152 U |
| Sep. 30, 2009 | (DE) | 20 2009 013 154 U |
| Apr. 9, 2010 | (EP) | 10159540 |
| Apr. 12, 2010 | (DE) | 20 2010 004 850 U |
| Apr. 21, 2010 | (DE) | 20 2010 005 953 U |

(51) Int. Cl.
*H02J 3/00* (2006.01)
*H02M 5/293* (2006.01)
*H04B 3/54* (2006.01)

(52) U.S. Cl.
CPC .......... *H02M 5/293* (2013.01); *H04B 3/54* (2013.01); *H04B 2203/542* (2013.01); *H04B 2203/5412* (2013.01); *H04B 2203/5458* (2013.01); *Y10T 307/25* (2015.04)

(58) Field of Classification Search
CPC ................. H02J 1/00; H02J 3/00; H04B 3/54
USPC ............................................. 307/1
See application file for complete search history.

(56) References Cited

U.S. PATENT DOCUMENTS

| 3,818,466 A * | 6/1974 | Honda ............ G08B 25/06 340/517 |
| 7,898,104 B1 * | 3/2011 | Verges ............ H02J 3/26 307/115 |
| 2004/0037221 A1 | 2/2004 | Aisa |

(Continued)

FOREIGN PATENT DOCUMENTS

| DE | 2264025 | 7/1973 |
| EP | 1134910 | 9/2001 |

(Continued)

*Primary Examiner* — Rexford Barnie
*Assistant Examiner* — Joseph Inge
(74) *Attorney, Agent, or Firm* — Davis & Bujold, PLLC; Michael J. Bujold

(57) ABSTRACT

A device for modifying an AC voltage has an input for connecting to an AC voltage source and an output for connecting to a load circuit. An interrupter is designed such that, within a time window, the output can be disconnected from the AC voltage source. The time window has a time delay from the zero crossing of the voltage of the AC voltage source. At the output, the device has a terminator that is designed, together with the interrupter, such that the voltage at the output has a predefined or predefinable value in the time window. The device also includes a pulse shape generator for generating a predetermined or predeterminable pulse shape, and a control that actuates the terminator and the interrupter such that the voltage curve at the output can be modified according to the pulse shape predetermined by the pulse shape generator.

9 Claims, 6 Drawing Sheets

(56) References Cited

U.S. PATENT DOCUMENTS

Figure 1:
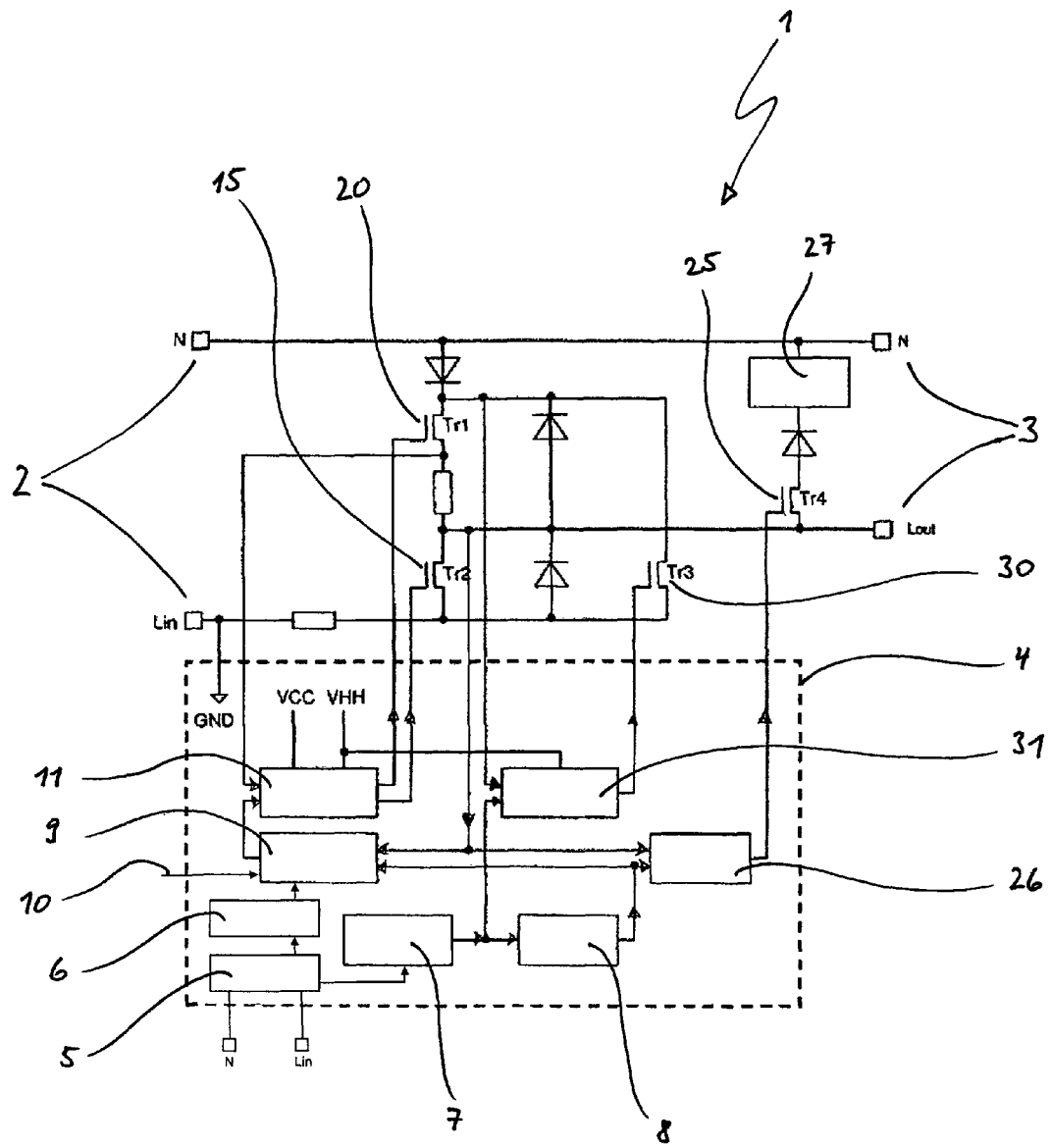

| | | | | |
|---|---|---|---|---|
| 2006/0262579 A1* | 11/2006 | Chou | H02M 3/1582 | 363/63 |
| 2009/0027932 A1* | 1/2009 | Haines | H02J 9/062 | 363/95 |
| 2010/0271039 A1* | 10/2010 | Durston | G01R 29/26 | 324/533 |

FOREIGN PATENT DOCUMENTS

| | | | |
|---|---|---|---|
| EP | 1675274 | 6/2006 | |
| IT | WO 2007045946 A1 * | 4/2007 | ............... H04B 3/54 |
| WO | 02/21664 | 3/2002 | |
| WO | 2007/045946 | 4/2007 | |
| WO | WO 2007045946 A1 * | 4/2007 | |

* cited by examiner

DEVICE FOR MODIFYING AN AC VOLTAGE, AC VOLTAGE HAVING A SUPERIMPOSED DATA SIGNAL, METHOD FOR DATA TRANSMISSION, USE OF A RECEIVER AND COMMUNICATION ARCHITECTURE

The present invention relates to an apparatus for modifying an AC voltage, to an AC voltage having a superimposed data signal, to a method for data transmission, to the use of a receiver and to a communication architecture.

The prior art discloses various apparatuses and methods for modifying an AC voltage. By way of example, power line communication (PLC) involves the AC voltage in a building power supply system having a high-frequency signal superimposed on it which can be used to transmit data. However, such a method has the disadvantage that the respective circuits act as antennas on account of the high frequency used, and the data transmitted in this manner are visible in another circuit.

US20040037221 proposes modifying the sine wave of the power supply such that the half-cycles of the AC power supply are clipped entirely or in half so as to impress a data signal on the AC voltage. On account of the massive intervention in the power supply, appliances connected to the system are no longer able to be operated properly, however. By way of example, a light bulb indicates the system disturbances by flickering.

EP1134910A2 discloses a method which uses different lengths of zero switching operations or blanking operations for the supply voltages to define different bit types and uses a simple circuit to allow the receiver to detect the bit types and to evaluate the respective control information. This data transmission method has the technical possibility of transmitting information to a plurality of loads connected to a common AC power supply by virtue of a line interruption or blanking operation being effected around the zero crossing of the voltage. Depending on the system, the loads cannot have any inductive or capacitive load components in this case, however, since these would disturb the described voltage blanking at the zero crossing of the voltage curve.

EP 1675274 B1 shows that a switch is used to interrupt the flow of current from a source to a load and that reactive powers in the load are dissipated by a low-value electrical resistor. For the purpose of data transmission, a reduction in the active power is impressed into the AC power supply system. A drawback of such an apparatus is particularly the high loading on the system when switching off, this being expressed in poor EMC.

It is an object of the invention to overcome the drawbacks of the prior art. In particular, the aim is to provide an apparatus for modifying an AC voltage, an AC voltage having a superimposed data signal, and a method for data transmission in an AC voltage network which is distinguished particularly by optimum electromagnetic compatibility (EMC).

This object is achieved by the apparatus, by the AC voltage and by the method for data transmission disclosed herein.

Here and subsequently, an AC power supply system is understood to mean an electrical network which ensures that power is supplied to various appliances by means of a wireborne AC voltage within a self-contained unit, for example within a house, a residence, a building, a vehicle, a railroad train, a ship, an aircraft, etc. Accordingly, an AC voltage source is understood to mean a generator, a transformer substation, a substation, an inverter in a photovoltaic installation, etc.

An apparatus according to the invention for modifying an AC voltage has an input for connection to an AC voltage source and an output for connection to a load circuit. Furthermore, the apparatus has an interrupter. Said interrupter is designed such that it at least partially isolates the output from the AC voltage source in controlled fashion within at least one time window. In this context, partial isolation is understood to mean that at least one high-impedance load is inserted between the input and the output of the apparatus. It is thus still possible for a small current component to flow. However, it is also conceivable for the interrupter to isolate the conductor L completely. The time window is at a defined or a definable interval of time from the zero crossing of the voltage from the AC voltage source. This may be a single time window or a plurality of time windows which are distributed over the period of one sine wave. The time window or the time windows may be arranged on the positive, on the negative or on both half-cycles of the sine wave.

If the apparatus is used for transmitting data signals via the AC power supply system, the zero crossing of the AC voltage can be used for synchronizing the time window of the apparatus to a reception window of an appropriately designed receiver, for example. It is therefore possible to dispense with complicated recognition of the start of a signal or of a bit without adversely affecting the interference immunity of the system. The receiver knows exactly when a signal can be expected. In particular, a timer can be used to define particular transmission windows and reception windows. The zero crossing of the system voltage thus provides a means which allows precise synchronization of transmitter and receiver.

The apparatus also has a terminator at the output. Said terminator is designed, particularly together with the interrupter, such that in the time window the voltage at the output of the apparatus has a predefined or predefinable value. Since the load circuit normally does not just have purely resistive loads but also usually has capacitive loads, the fall in the voltage curve at the output of the apparatus when it is isolated from the AC voltage source will occur in undefined fashion. It is therefore possible only for a controlled terminator to achieve a defined modification of the AC voltage at the output of the apparatus and to effectively suppress any interference pulses which may be present from the load, for example inductive spikes in motors.

In addition, the apparatus has a pulse shape generator which generates a predetermined or predeterminable pulse shape. In this case, a single pulse having a particular pulse shape or else a plurality of pulses having one or various pulse shapes can be generated. In this case, the individual pulse shape may be square, trapezoidal, Gaussian or $\sin^2$-shaped. It goes without saying that other pulse shapes or combinations thereof are also conceivable.

Furthermore, the apparatus has control means which actuate the terminator and the interrupter such that the voltage curve at the output of the apparatus can be modified in accordance with the pulse shape prescribed by the pulse shape generator. In this case, particularly the edge of the voltage curve needs to be modified in accordance with the pulse shape. In order to achieve the lowest possible loading of the AC power supply system with high-frequency electromagnetic interference, that pulse shape which causes the least possible high-frequency interference on the AC power supply system is advantageously selected. It has been found that a $\sin^2$-shaped or Gaussian pulse shape ensures the best compatibility in this case. The modification of the AC voltage is not prescribed purely by the pulse shape in this case, it is also necessary to take account of other factors, such as the magnitude of the deviation.

Preferably, both the terminator and the interrupter are formed by a power transistor which, besides a pure on/off switching function, also has the possibility of being actuated specifically, so that the desired pulse shapes can be mapped. Alternatively, it is conceivable for other circuit elements to be used for this.

The AC voltage source is normally the local AC power supply system, as is connected to the building installation in a distributor. Usually, the input of the apparatus is connected directly downstream of the automatic circuit-breaker in a circuit or load circuit, and the output is then connected to the circuit or load circuit. However, the apparatus can also be inserted into the circuit at another location. It goes without saying that the apparatus can be designed not only for the 220/240 V-50 Hz that are customary in Europe but also for AC power supply systems at 110/120 V-60 Hz and any combinations thereof. AC power supply systems at other voltages, and AC power supply systems at system frequencies differing from the customary 50/60 Hz, are likewise conceivable.

The time window may have a range from 10 µs to 300 µs, preferably from 20 µs to 200 µs, particularly preferably from 25 µs to 100 µs. Since the time window is chosen not to be excessively large, it is possible to ensure that only a small component of power is used on the AC power supply system for the data transmission and is therefore not available for the power transmission. Alternatively, it is possible for the time window to be chosen to be larger.

The interval of time between the time window and the zero crossing may be from 0 µs to 10 000 µs, preferably 100 µs to 5000 µs, particularly preferably 200 µs to 1000 µs. In this case, the time window may be arranged on the positive sine wave or else on the negative sine wave. Accordingly, one, the other or both zero crossings can be used to determine the interval of time. Particularly in the case of an interval of time of zero, that is to say at the zero crossing, it is not possible for any modulation to take place. If the interval of time from the zero crossing is not zero, the AC voltage can be modified more distinctly, i.e. so as to be more easily identifiable. Thus, in a first section, the AC voltage rises as usual before then being modified to a particular value by the interrupter and the terminator. A defined edge is thus produced at the start of the time window. Similarly, at a suitable distance from the zero crossing, it is possible to obtain a rising edge if the end of the time window is situated on the falling edge of the sine wave. By switching on the interrupter again, a positive pulse edge is produced both at the rising edge and at the falling edge of the sine wave.

The value of the voltage may be approximately constant in the time window. In this case, constant is understood to mean that the curve within a range from 5% to 95% of the time window, particularly an averaged curve in the case of a superimposed AC signal, deviates from a starting value at the instant of the start of the time window by less than 20%, preferably less than 10%, particularly preferably less than 5%. In this case, said starting value may be at zero or at another voltage value.

Alternatively, the deviation in the voltage in the time window from the theoretical value of the AC voltage applied to the input of the apparatus may also be approximately constant, however. In this case, approximately constant is understood to mean that the gradient of the curve within a range from 5% to 95% of the time window, particularly an averaged curve in the case of a superimposed AC signal, deviates from the gradient of the theoretical sine curve of the AC voltage by less than 20%, preferably less than 10%, particularly preferably less than 5%.

It should be noted that the two edges of an envelope for the deviation are separate from one another in time. Thus, the envelope of the deviation is intended to correspond approximately to a trapezium, with the base on the theoretical sine curve. An excessively short time window in which the two edges touch needs to be avoided.

The apparatus may have, at the output, a booster which is designed such that when the output is enabled by the interrupter the voltage curve at the output of the apparatus is additionally supported, or raised, and as a result the voltage curve has a pulse corresponding to the pulse shape prescribed by the pulse shape generator. A booster is understood to mean a circuit which, when required, can pull the load-side voltage to a voltage level which is raised in comparison with ground, such a circuit alternatively also being called a pullup circuit. Particularly in the case of a very high capacitive load in the load circuit and in the event of the sine voltage failing, for example in the case of ripple control, care is taken to ensure that the steepness of the positive edge of the load-side AC voltage modulation remains reproducible.

On account of ripple control methods in power supply systems, the AC power supply system sine wave is superimposed with an audio frequency at particular times of day for a certain time, which can last up to a few minutes. This results in significant jitter in the zero crossing of the source-side AC voltage wave and hence in a no longer explicitly predictable instant for the production of the AC voltage modulation, because the zero crossing of the sine wave occurs earlier than in the normal case on account of the superimposition with an audio frequency. Hence, when the interruption is an instant close to the zero crossing, it is difficult to determine the correct instant for the modification of the load-side AC voltage on the falling sine wave. Cases may arise in which the system voltage on the source is already so low that a positive edge of the AC voltage modulation can no longer be represented. The booster ensures that a recognizable rising pulse edge is nevertheless produced on the AC voltage on the load side. This can be done by charging a sufficiently large buffer capacitance from the source continuously, for example. This capacitance serves as an energy reservoir for the booster.

In addition, the apparatus may have, at the input, a dummy load which is dependent on the modification produced and which is designed such that the isolation of the output from the AC voltage source cannot be perceived by the latter. Such a dummy load on the source side compensates for the abrupt changes of current which are produced by isolating the source from the load circuit using the interrupter of the apparatus and which, depending on the level of the source impedance, can result in voltage changes in the source circuit. Such a dummy load means that the modification of the AC voltage is no longer visible on the source side. The apparatus is decoupled from the AC voltage source. Crosstalk in adjacent circuits is therefore negligible. Furthermore, this severely reduces the loading by the source-side line-borne high-frequency interference.

An AC voltage according to the invention with a superimposed data signal has a deviation from the approximated sine curve for the voltage from an AC voltage source within at least one time window. In this case, the time window is at an interval of time from the zero crossing of the AC voltage from an AC voltage source. The data signal is contained in the deviation from the approximated sine curve for the voltage from an AC voltage source. In this case, the data signal may have been modulated in different ways, for example by means of pulse width modulation, amplitude modulation, modulation of the interval of time from the zero crossing, modulation of the pulse interval for a plurality of pulses, modulation of the pulse shape and pulse length. It goes without saying that other types of modulation and/or a combination of the types of modulation are also possible. In this case, the value of the voltage in the time window corresponds to a prescribed pulse shape. Furthermore, the value of the voltage in the time window may be approximately constant, approximately constant being understood to mean the same definition as already mentioned above. Similarly, the deviation in the voltage in the time window from the approximated sine curve for the voltage from an AC voltage source may be approximately constant. In this case too, approximately constant is intended to be understood to mean the definition mentioned further above.

The edges of the deviation from the approximated sine curve for the AC voltage may correspond to a prescribed or prescribable pulse shape. The effect which can be achieved by this is that the AC voltage with a superimposed data signal is optimized in terms of EMC, for example. It has been found to be advantageous if the edges of a $\sin^e$ curve or a Gaussian curve are approximated. Other edge shapes are likewise conceivable.

The time window may have a range from 10 µs to 300 µs, preferably from 20 µs to 200 µs, particularly preferably from 25 µs to 100 µs. Since the time window is chosen not to be excessively large, it is possible to ensure that only a small component of power is used on the AC power supply system for the data transmission and hence is not available for the power transmission. Alternatively, it is possible for the time window to be chosen to be larger. In this case, however, care should be taken to ensure that the appliances in the load circuit are not disturbed.

The interval of time between the time window and the zero crossing may be from 0 µs to 10 000 µs, preferably 100 µs to 5000 µs, particularly preferably 200 µs to 1000 µs. In this case, the time window may be arranged on the positive sine wave or else on the negative sine wave. Accordingly, one, the other or both zero crossings can be used to determine the interval of time. If the interval of time is not zero, the AC voltage can be modified more distinctly, i.e. so as to be more easily recognizable. Thus, the AC voltage rises as usual in a first section before it is then modified by the interrupter and the terminator to a particular value. An defined edge is thus obtained at the start of the time window. Similarly, with a suitable interval from the zero crossing, a rising edge can be obtained if the end of the time window is at an interval from the zero crossing.

In a method according to the invention for data transmission from a transmitter to a receiver in an AC power supply system, the transmitter is arranged on the source side of the receiver and the receiver is arranged on the load side of the transmitter. The transmitter modifies the AC voltage from an AC voltage source such that it corresponds to the previously described AC voltage with a superimposed data signal.

In a communication architecture according to the invention for data transmission in an AC power supply system having a trunk line, a distributor, at least two load circuits with one or more loads, the load circuit has an associated apparatus defined as previously. Furthermore, the load has an associated receiver which receives a data signal superimposed on the AC voltage and controls the load in accordance with the received data signal. Furthermore, the apparatuses of the at least two load circuits are connected to one another by means of a data bus for communication with one another and/or to an optional central computation unit.

A further aspect of the invention relates to the use of a receiver for reading data signals from an AC voltage as described above.

A further aspect of the invention relates to the use of a receiver in an electrical appliance to allow data signals to be read from an AC voltage as described above. In this case, the data signals are used inter alia to influence the use of an electrical appliance. By way of example, such a use is understood to mean that a dimmer, a switch, a stereo system, a roller blind, an oven, a motor, etc., incorporates a receiver which reads data signals from the AC voltage, which are transmitted via the line system read, processes the data signals and, on the basis of the data signal, control the appliance, that is to say dim it, switch it on or off, adjust its volume up or down, open or close it, or set the temperature to a prescribed value.

Figure 2:
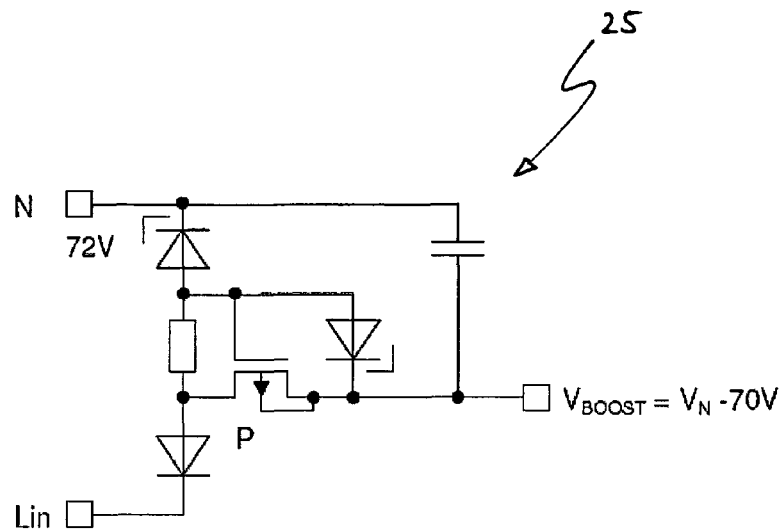
Figure 3:
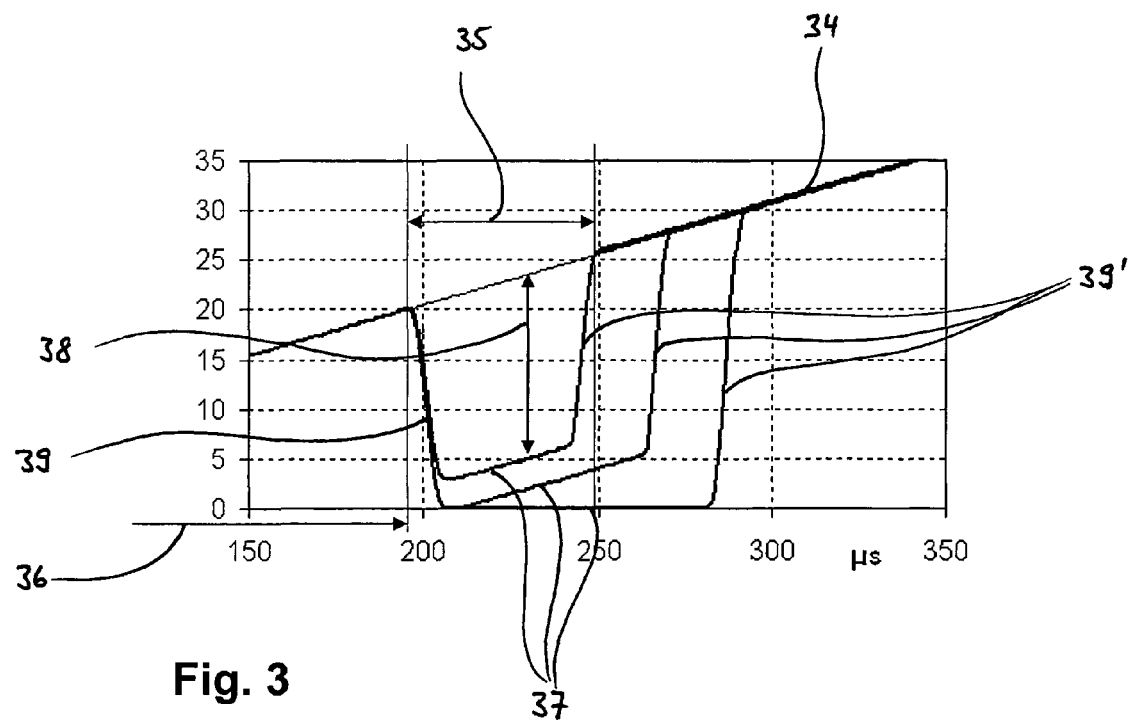
Figure 4:
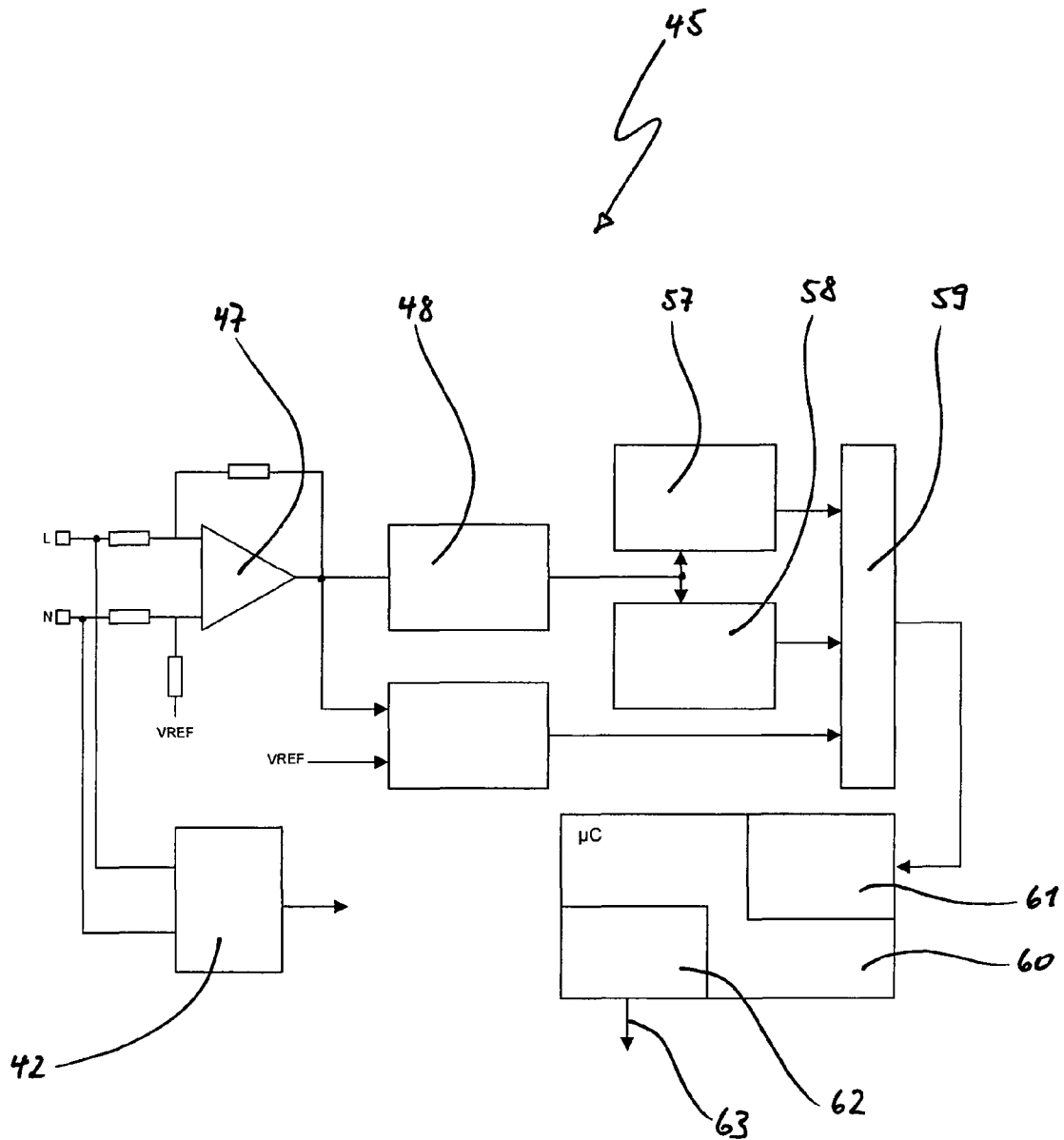
Figure 5:
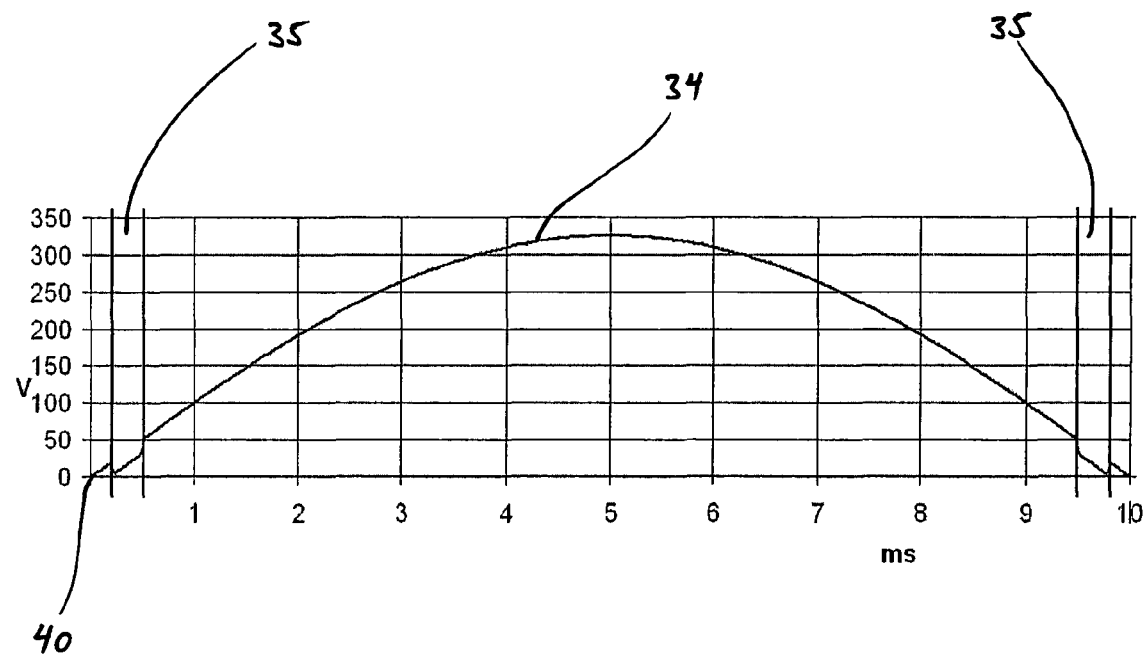
Figure 6:
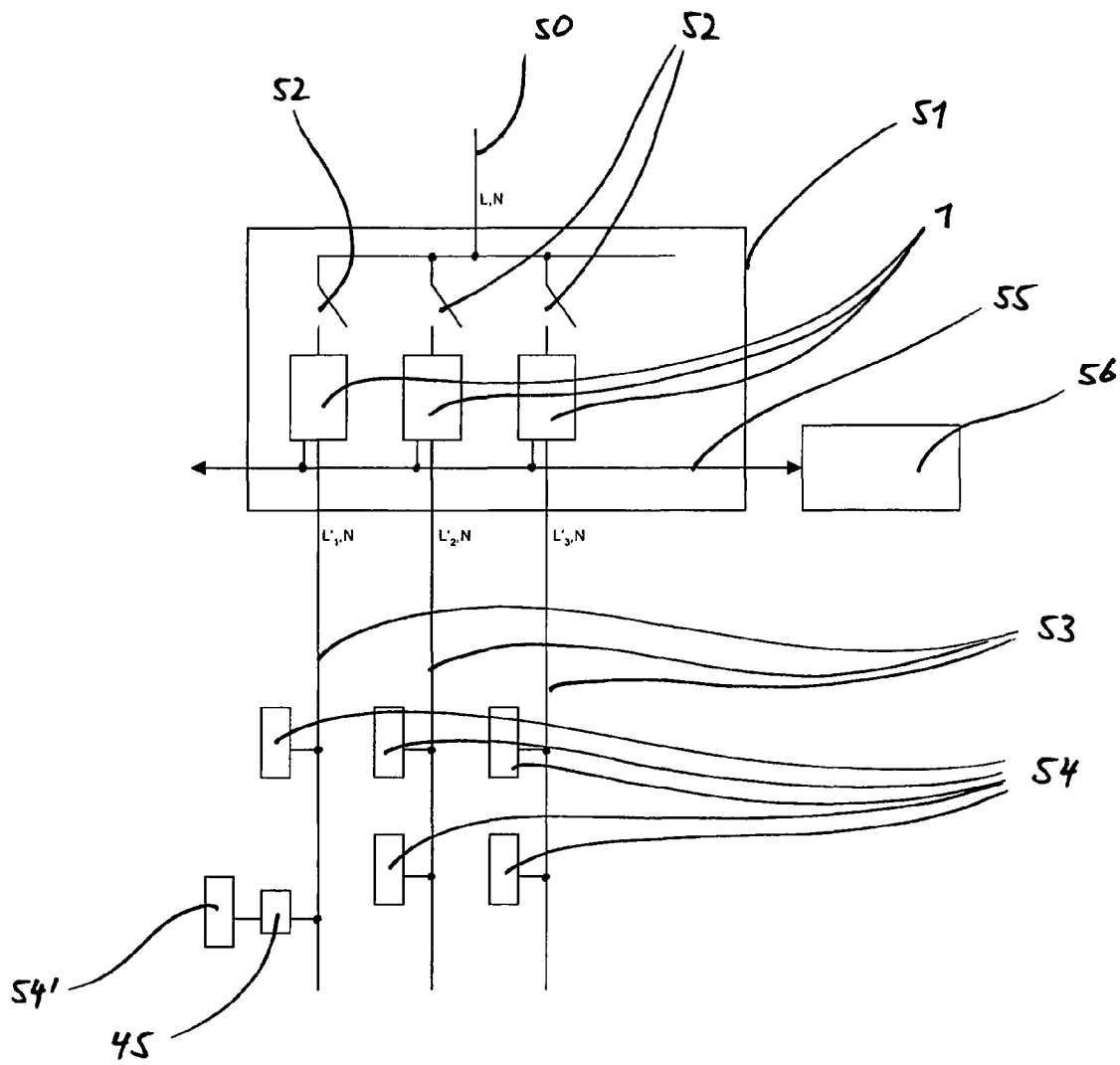
Figure 7:
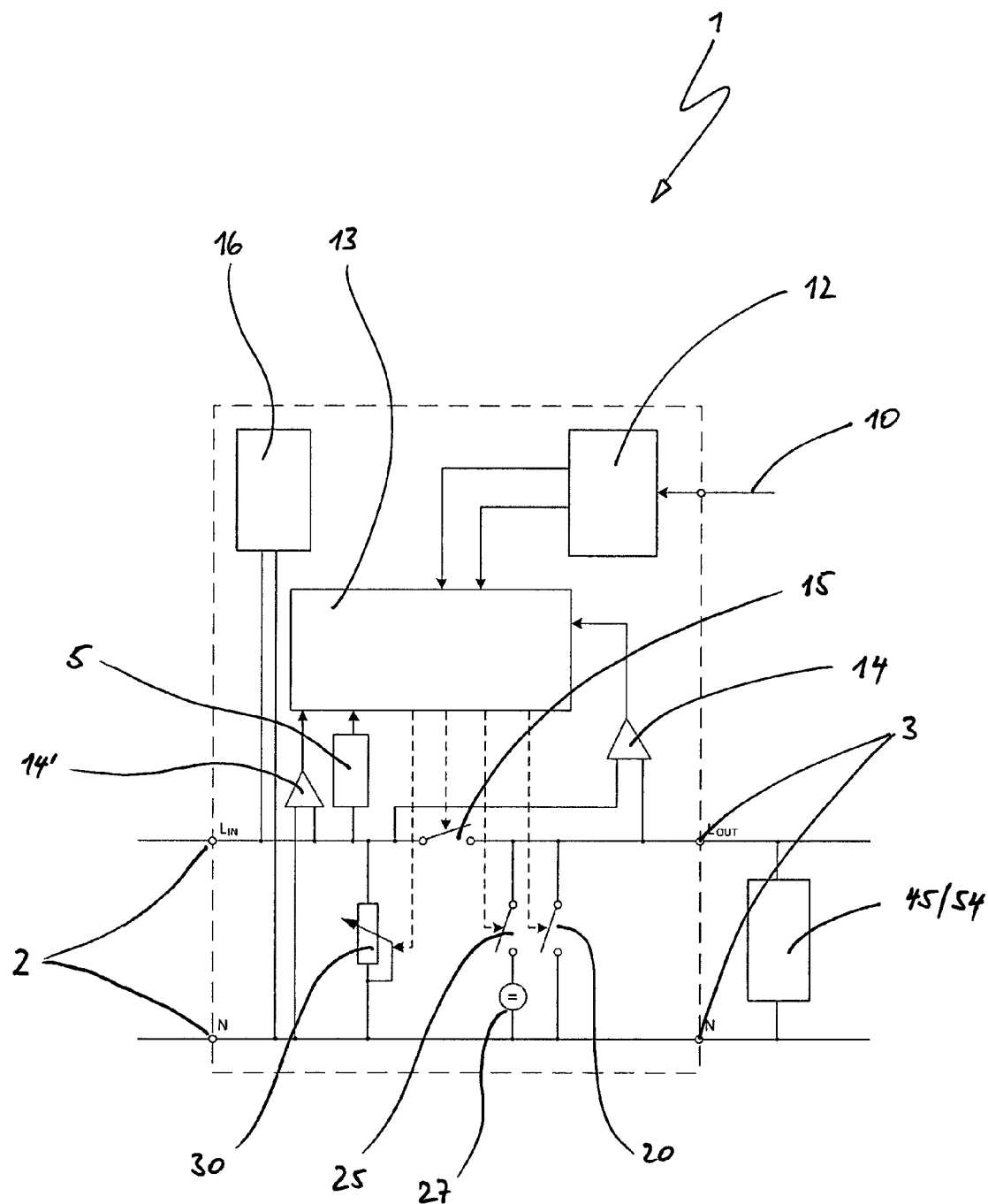

The invention is explained in more detail below with reference to figures which are merely exemplary embodiments and in which:

FIG. 1 shows an apparatus according to the invention for modification of the AC voltage, FIG. 2 shows a booster circuit, FIG. 3 shows a detail from a modified AC voltage according to the invention, FIG. 4 shows an exemplary receiver circuit, FIG. 5 shows a positive half-cycle of an AC voltage modified according to the invention, FIG. 6 shows a communication architecture according to the invention, and FIG. 7 shows a functional diagram of an apparatus according to the invention.

FIG. 1 shows an apparatus 1 according to the invention for modifying an AC voltage. The apparatus 1 has an input 2 and an output 3. The apparatus 1 is connected by means of its input 2 to an AC power supply system. The output 3 of the apparatus 1 can have a load circuit connected to it. Such a load circuit may have a plurality of loads. The conductor L has an interrupter 15 arranged on it between the input 2 and the output 3. This interrupter 15 is actuated by a control means 4 such that the conductor L between the input 2 and the output 3 is interrupted in the region of a time window. This time window is generated within the control means 4 in a defined manner by a transmission window generator 6. The load in the load circuit, which can be connected to the output 3 of the apparatus 1, may have capacitive components. Therefore, the voltage at the output 3 does not fall as required when the conductor L is interrupted. For this reason, the neutral conductor N and the conductor Lout have a terminator 20 provided between them on the output side. This terminator 20 is actuated by the control means 4 such that it can short or at least place a low impedance load on the neutral conductor N and the conductor Lout on the output side during the time window. When the time window has elapsed, the interruption in the conductor L between the input and the output is cleared again by the interrupter 15. At the same time, the terminator 20 turns off again or changes to high impedance, so that the neutral conductor N is isolated from the conductor Lout. Ideally, the modified AC voltage now immediately rises to the value which is applied to the input 2. However, if high capacitive loads or a high internal resistance in the system on the load circuit side mean(s) that the voltage at the output 3 cannot rise quickly enough and therefore a reliably recognizable pulse is not produced in the sine wave, a booster 25 is used. Such situations can arise particularly during the system transmission of ripple control sequences. Since the AC voltage has had the ripple control sequence modulated onto it, the instant of the zero crossing cannot always be determined explicitly. It is therefore possible for the instant of the AC voltage modification of the load-side AC voltage curve to be shifted in the direction of the zero crossing of the falling sine voltage to such an extent that there is no further voltage present for a rising edge of the AC voltage modification. The booster 25 is used to generate such a rising edge nevertheless. To this end, current is additionally drawn from the load on the conductor Lout from a booster voltage generator 27, which generates a voltage of approximately −70 V, for example. Since the interrupter 15 is already fully on when the booster 25 is activated, the booster 25 also undertakes the function of producing a desired profile for the edge on the conductor Lout. The booster voltage is obtained directly from the system. The neutral conductor N and the conductor L additionally have a dummy load 30 arranged between them. This dummy load 30 undertakes the function of a load for the input 2 during the AC voltage modification. The AC voltage source therefore cannot recognize the modification of the AC voltage.

The control means 4 has a zero crossing detector 5. This zero crossing detector 5 and a transmission window generator 6 are used to actuate a pulse controller 9. Furthermore, the pulse controller 9 has a data input 10 in order to transmit a desired data sequence. A level matching unit 11 is used to control both the interrupter 15 and the terminator 20, both of which are in the form of a transistor, for example. The voltage which is applied to the conductor Lout at the instant of the end of the transmission window is reported back to an auxiliary current regulator 26. When required, the auxiliary current regulator 26 then controls the booster 25 such that it can simulate the theoretical value of the approximated sine curve. In order to allow such simulation, a predictor 7 is present. By way of example, the predictor 7 can use a Taylor series progression to approximate the sine profile of the AC voltage source. Alternatively, it is also possible to approximate the sine profile over the period of the time window linearly, that is to say to approximate it using a constant gradient. The dummy load controller 31 controls the dummy load 30 in the form of a transistor such that the modification of the AC voltage cannot be perceived on the system. In order to ensure the lowest possible loading by high-frequency electromagnetic interference both on the input side and on the output side of the apparatus 1, a pulse shape generator 8 is additionally present which ensures that the edges of the modification run in accordance with a preset or presettable pulse shape. It has been found that a Gaussian or $sin^2$-shaped pulse shape exhibits good results in terms of EMC.

FIG. 2 shows a circuit for a booster 25. From a booster voltage, which is at approximately −70 V, current is additionally drawn from the load on the conductor Lout as required. Since the transistor of the interrupter is already fully on when the booster 25 is activated, the transistor of the booster 25 undertakes the function of producing the pulse shape as per the pulse shape controller on the conductor Lout.

FIG. 3 shows a detail from a modified AC voltage 34 according to the invention. In a time window 35, the AC voltage 34 has a deviation 38 from the theoretical shape of a sine voltage. The envelope of the AC voltage 34 in the region of the time window 35 is approximately trapezoidal. In this case, the value 37 of the AC voltage 34 can run approximately parallel to the theoretical sine curve or else may be approximately constant in a particular range. The time window 35 is at an interval of time 36 from the zero crossing 40 (see FIG. 5) of the AC voltage 34. The falling edge 39 of the modified AC voltage 34 has a shape which is prescribed by the pulse shape generator. It has been found that a pulse shape approximated to a $sin^e$ curve or to a Gaussian shape results in an optimized EMC value. The rising edge 39' is also shaped accordingly after the time window 35 has elapsed. The illustration shown in FIG. 3 shows three different lengths of time window 35. Two of the modified AC voltages 34 have a value 37 in the time window 35, which value runs approximately parallel to the theoretical shape of the sine curve. However, a modified AC voltage 34 which is mapped with the longest time window has an approximately constant value 37 within the time window.

FIG. 4 shows a circuit for an exemplary receiver 45, the load side of which can be connected to an apparatus according to the invention. The input side of the receiver 45 has two conductors L and N which are connected to the conductors L and N of an AC power supply system in the usual manner. The receiver 45 has a power supply unit 42 which ensures the receiver-internal supply of power. The two conductors L and N are routed to a differential amplifier 47. On the basis of the signal applied to the differential amplifier, the zero crossing detector 49 is used to ascertain the zero crossing of the received AC voltage. The signal from the differential amplifier 47 is further supplied to a bandpass filter 48. This bandpass filter rejects all frequencies below 3 kHz, in particular. Hence, the system frequency, which is usually 50/60 Hz, and all possible ripple control frequencies are reliably rejected. Similarly, low-frequency interference from 0 to 3 kHz is rejected. The upper frequency of the bandpass filter 48 is set such that the data signals to be expected are clearly detectable, but high-frequency interference is rejected. On the basis of experience, such an upper frequency is in the region of approximately 90 kHz, which particularly means that particularly the carrier frequencies for the known power line communication (PLC), such as HomePlug and DS2, which are in the MHz range, are effectively rejected. On the basis of the signal from the bandpass filter 48, a threshold value comparator 57 and an extreme value trigger 58 together with the ascertained zero crossing are used within a digital evaluation unit 59 to analyze the voltage map according to instant, threshold and extreme value. The relevant signal is supplied to a digital input 61 of a microcontroller 60. The microcontroller 60 makes a decision about the validity of the pulses analyzed in the reception time window, decodes the data information therefrom and then controls a power electronics unit 62 such that an appliance connected to the output 63 is actuated in accordance with the received data information.

As an alternative to said analog analysis, it is also possible to use a digital correlation receiver. In this case, a correlator compares the system voltage map with a pulse shape which is known to the correlator for the transmission pulse in the reception time window.

A further option is provided by using a digital receiver in a reception time window on the basis of a digital Fourier analysis. In this case, the frequency spectrum of the voltage map is analyzed for a match with the spectrum of the known transmission pulse.

FIG. 5 shows an AC voltage 34 according to the invention which has a modification in the form of a deviation within two time windows 35. The two time windows 35 are arranged around a particular interval of time from the zero crossing 40 of the AC voltage 34. It is also conceivable for more than two time windows 35 to be arranged on a half-cycle of the AC voltage.

FIG. 6 shows a communication architecture according to the invention for data transmission in an AC power supply system. Starting from a trunk line 50 which is supplied to a distributor 51, the AC power supply system is split into individual load circuits 53. In this case, each load circuit 53 has a separate automatic circuit-breaker 52 directly adjacent to the trunk line 50. Such an automatic circuit-breaker 52 ensures that in the event of excessive loading on a load circuit 53 the latter is isolated from the trunk line 50 before damage can occur. Arranged adjacent to the automatic circuit-breaker 52 is an apparatus 1 which modifies the AC voltage in the load circuit 53. Such an apparatus 1 can also be called a transmitter. The load circuit 53 has one or more loads 54 arranged on it. The loads 54 are then able to detect the modified AC voltage signal which is generated by the apparatus 1 and to read and process the relevant data signal. To this end, each load 54 has an integrated receiver circuit. The load 54' is provided with an external receiver 45. The load 54' is a conventional light bulb, for example. Since this load 54' is connected to the load circuit 53 via a receiver 45, the apparatus 1 can be used to switch on or off a conventional light bulb 54', for example. The apparatuses 1 are connected to one another by means of a data bus 55. In addition, a central computation unit 56 is shown which is likewise connected to the apparatuses 1 by means of the data bus 55. Hence, it becomes possible to control the loads 54 from the central computation unit 56. Such a communication architecture is particularly advantageous when each apparatus 1 is not only in the form of a transmitter but also comprises means which allows data signals to be received. If the receivers 45 or the integrated receivers in the loads 54 additionally have a transmission unit, it is even possible for bidirectional communication to take place between receiver and apparatus 1 or central computation unit 56.

FIG. 7 shows a functional diagram of an apparatus 1 according to the invention. The apparatus 1 has an input 2 for connection to an AC voltage source. At the output 3 of the apparatus 1, an electrical appliance 54 having a receiver 45 is shown, which are connected directly to the two conductors N and Lout of the apparatus 1. Arranged on the conductor L between the input 2 and the output 3 is an interrupter 15 which isolates the conductor L at the desired instant. The interrupter is actuated by a regulator 13. Arranged between the conductor L and the neutral conductor N is a terminator 20 which connects the conductor Lout and the neutral conductor N at low impedance on the output side at the same time as the conductor L is interrupted by the interrupter 15. This ensures that the voltage at the output 3 is pulled downward. The terminator 20 is also controlled by the regulator 13. In addition, the conductor L and the neutral conductor N have a booster 25 arranged between them with a boost voltage generating unit 27, and also have a dummy load arranged between them. Both the booster 25 and the dummy load are actuated by the regulator 13.

The booster 25 is used when the interrupter 15 connects the two conductors Lin and Lout again on the falling edge of the AC voltage, for example, and the terminator 20 turns off again. If the applied voltage at the input 2 is then not sufficiently high to achieve a specific rise in the AC voltage, for example in the case of a shifted zero crossing as a result of a superimposed ripple control signal, the booster 25 would impose a pulse on the conductor Lout using the boost voltage generator 27. Therefore, the end of the interruption can be detected on the receiver 45 nevertheless.

During the interruption or during the modification of the AC voltage, the dummy load 30 simulates the load which is present at the output 3, so that the input side of the AC power supply system is not loaded unnecessarily. Interference triggered by abrupt switching operations is suppressed.

The regulator 13 is connected to a zero crossing detector 5, as a result of which the regulator 13 can control the interrupter 15, the terminator 20, and possibly the booster 25 on the basis of the zero crossing of the AC voltage. The regulator 13 also has a respective input on the two measuring amplifiers 14, 14', which measure the actual value of the AC voltage at the input 2 and the actual value of the voltage difference between conductor Lin at the input 2 and conductor Lout at the output 3. Furthermore, the regulator 13 has an input from a controller 12 which transfers the pulse and further parameters, for example relating to the pulse shape or pulse sequence. To this end, the controller 12 has a data input 10, which may be connected to a central computation unit 56 (see FIG. 6), for example.

The invention claimed is:

1. An apparatus for modifying an AC voltage of an AC power supply system, said apparatus comprising:
   an input for connection to an AC voltage source and an output for connection to a load circuit,
   an interrupter, between the input and the output which at least partially isolates the output from the AC voltage sourced during a time window, wherein the time window is at an interval of time from a zero crossing of the voltage from the AC voltage source,
   a terminator at the output between a neutral conductor and a conductor, said terminator being designed such that in the time window, the neutral conductor and the conductor at the output to the load circuit are shorted or at least are low impedance loaded such that, together with the interrupter, the voltage at the output of the apparatus has a predefined or predefinable value,
   a pulse shape generator for generating a predetermined or predeterminable pulse shape, and
   control means which actuate the terminator and the interrupter to modify the voltage curve, at the output of the apparatus, in accordance with the pulse shape prescribed by the pulse shape generator.

2. The apparatus as claimed in claim 1, wherein the time window has a range from 10 μs to 300 μs.

3. The apparatus as claimed in claim 1, wherein the interval of time from the zero crossing is from 0 μs to 10 000 μs.

4. The apparatus as claimed in claim 1, wherein the value of the voltage curve within a range from 5% to 95% of the time window deviates from a starting value at the instant of the start of the time window by less than 20%.

5. The apparatus as claimed in claim 1, wherein the deviation in the voltage in the time window from the value of the AC voltage that is applied to the input of the apparatus has a gradient of the curve within a range from 5% to 95% of the time window which deviates from a gradient of the theoretical sine curve of the AC voltage by less than 20%.

6. The apparatus as claimed in claim 1, further comprising, at the output, a booster which is designed such that when the output is enabled by the interrupter, the voltage curve at the output of the apparatus is additionally supported and as a result the voltage curve has a pulse in accordance with the pulse shape prescribed by the pulse shape generator.

7. The apparatus as claimed in claim 1, further comprising, at the input, a dummy load which is dependent on the modification produced and which is designed such that the isolation of the output from the AC voltage source cannot be perceived by said AC voltage source.

8. A communication architecture for data transmission in an AC power supply system having a trunk line, a distributor, and at least two load circuits with one or more loads, each said load circuit having an associated apparatus as claimed in claim 1,
   wherein the load has an associated receiver which receives a data signal superimposed on the AC voltage and controls the load accordingly, and
   the apparatuses are connected to one another via a data bus for the purpose of communication with one another or to a central computation unit.

9. A method for transmitting data signals on a AC power supply system using an apparatus as claimed in claim 1, wherein the zero crossing of the AC voltage is used for synchronizing a time window of the apparatus to a reception window of an appropriately designed receiver.

* * * * *